US010250174B2

(12) United States Patent
Sakai et al.

(10) Patent No.: US 10,250,174 B2
(45) Date of Patent: Apr. 2, 2019

(54) MOTOR DRIVING DEVICE

(71) Applicant: DENSO CORPORATION, Kariya, Aichi-pref. (JP)

(72) Inventors: Koji Sakai, Kariya (JP); Akitomo Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/576,317

(22) PCT Filed: May 19, 2016

(86) PCT No.: PCT/JP2016/002446
§ 371 (c)(1),
(2) Date: Nov. 22, 2017

(87) PCT Pub. No.: WO2016/203709
PCT Pub. Date: Dec. 22, 2016

(65) Prior Publication Data
US 2018/0175766 A1 Jun. 21, 2018

(30) Foreign Application Priority Data

Jun. 18, 2015 (JP) .................................. 2015-122982

(51) Int. Cl.
*F25B 13/00* (2006.01)
*H02P 23/00* (2016.01)
(Continued)

(52) U.S. Cl.
CPC ............ *H02P 23/009* (2013.01); *F25B 13/00* (2013.01); *F25B 31/026* (2013.01); *H02P 3/18* (2013.01); *H02P 27/08* (2013.01); *H02P 29/68* (2016.02)

(58) Field of Classification Search
CPC combination set(s) only.
See application file for complete search history.

(56) References Cited

U.S. PATENT DOCUMENTS

| 2005/0012490 A1* | 1/2005 | Ueda | ........................ H02P 27/08 |
| | | | 318/807 |
| 2013/0141027 A1* | 6/2013 | Nakata | ...................... H02P 6/08 |
| | | | 318/400.23 |

(Continued)

FOREIGN PATENT DOCUMENTS

JP 2007181336 A 7/2007

*Primary Examiner* — Muhammad S Islam
(74) *Attorney, Agent, or Firm* — Harness, Dickey & Pierce, P.L.C.

(57) ABSTRACT

A motor driving device for a motor having a stator and a rotor rotationally driven by an input of an AC voltage includes: an inverter circuit having multiple units corresponding to multiple phases respectively, each unit having a pair of a switching element and a reflux diode connected in anti-parallel to the switching element; and a control device controlling the inverter circuit to convert a DC voltage into the AC voltage and to output the AC voltage to the stator coil. The control device includes: a field weakening control unit adjusting the AC voltage to control a magnetic field of the stator coil to weaken a field magnetic flux of the rotor; and a regenerative current control unit switching an anti-regenerative side switching element to flow a regenerative current when the AC voltage stops while the field weakening control unit performs the field weakening control.

8 Claims, 9 Drawing Sheets

(51) Int. Cl.
*F25B 31/02* (2006.01)
*H02P 27/08* (2006.01)
*H02P 3/18* (2006.01)
*H02P 29/68* (2016.01)

(56) References Cited

U.S. PATENT DOCUMENTS

2013/0154524 A1* 6/2013 Kleinau .................... H02P 3/18
 318/376
2014/0223926 A1* 8/2014 Hatakeyama ........... H02M 1/32
 62/56

* cited by examiner

MOTOR DRIVING DEVICE

CROSS REFERENCE TO RELATED APPLICATIONS

This application is a U.S. National Phase Application under 35 U.S.C. 371 of International Application No. PCT/JP2016/002446 filed on May 19, 2016 and published in Japanese as WO 2016/203709 A1 on Dec. 22, 2016. This application is based on and claims the benefit of priority from Japanese Patent Application No. 2015-122982 filed on Jun. 18, 2015. The entire disclosures of all of the above applications are incorporated herein by reference.

TECHNICAL FIELD

The present disclosure relates to a motor drive device that drives a permanent magnet synchronous motor using an inverter circuit.

BACKGROUND ART

As a conventional technology, there is a motor drive device that drives a permanent magnet synchronous motor using an inverter circuit disclosed in, for example, Patent Literature 1. In such a motor drive device, when the motor is stopped, the motor generates a regenerative energy.

In the conventional motor drive device, when a regenerative current from the motor is large, the inverter circuit may be damaged by the regenerative current. In particular, when the rotation of the motor is stopped from a state in which the motor is driven under a field weakening control, a relatively large regenerative current flows into the inverter circuit, and the inverter circuit is likely to be damaged.

PRIOR ART LITERATURES

Patent Literature

Patent Literature 1: JP-2007-181336-A

SUMMARY

It is an object of the present disclosure to provide a motor drive device capable of preventing an inverter circuit from being damaged by a regenerative current.

According to an aspect of the present disclosure, a motor driving device for a motor that includes: a stator having a plurality of stator coils corresponding to a plurality of phases respectively; and a rotor having a permanent magnet and rotationally driven by an interaction between the stator coil, to which an AC voltage is input, and the permanent magnet, the motor driving device includes: an inverter circuit that includes a plurality of units corresponding to plurality of phases respectively, each unit having a pair of a switching element and a reflux diode connected in anti-parallel to the switching element; and a control device that controls the inverter circuit to switch each switching element, to convert a DC voltage into the AC voltage, and to output the AC voltage to the stator coil. The control device includes: a field weakening control unit that performs a field weakening control for adjusting an output of the AC voltage to the stator coil to control a magnetic field generated by the stator coil to weaken a field magnetic flux of the rotor; and a regenerative current control unit that switches an anti-regenerative side switching element being a switching element of one of the plurality of units in which no regenerative current flows into the reflux diode from the stator coil, and flows a regenerative current through the anti-regenerative side switching element when the output of the AC voltage to the stator coil is stopped while the field weakening control unit performs the field weakening control.

According to the motor drive device described above, when the output of AC voltage to the stator coil is stopped while the field weakening control is being performed, a regenerative current can flow through the anti-regenerative side switching element. Therefore, when the motor is stopped during the field weakening control and a relatively large regenerative current flows in the inverter circuit, the regenerative current can be distributed to not only the reflux diode but also the anti-regenerative side switching element. In this manner, the inverter circuit can be prevented from being damaged due to the regenerative current.

BRIEF DESCRIPTION OF DRAWINGS

The above and other objects, features and advantages of the present disclosure will become more apparent from the following detailed description made with reference to the accompanying drawings. In the drawings.

EMBODIMENTS

First Embodiment

A first embodiment according to the present disclosure will be described with reference to FIGS. 1 to 9.

Figure 1:
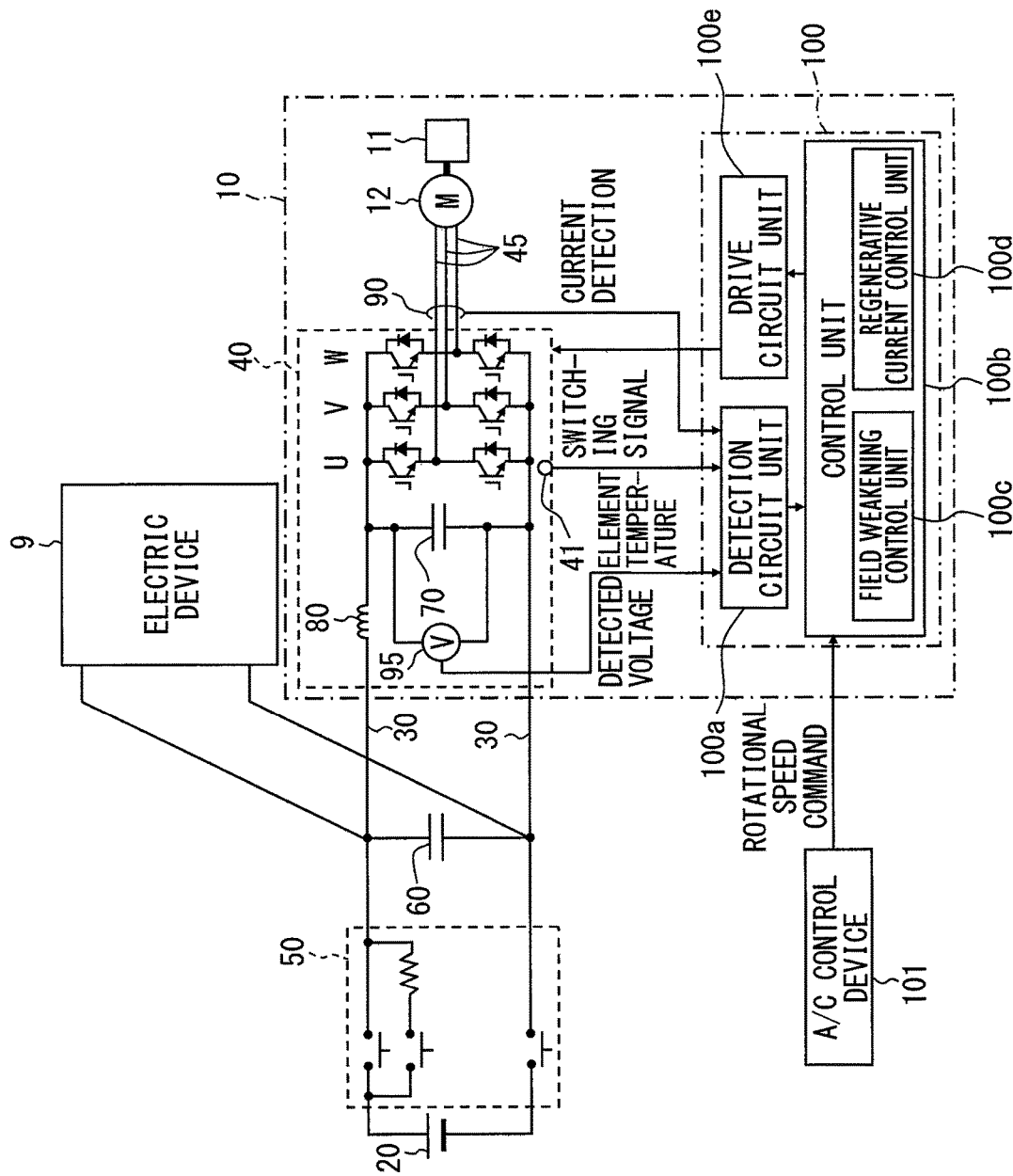
FIG. 1 is a circuit diagram illustrating a circuit including an electric compressor partially with blocks according to a first embodiment of the present disclosure.

As illustrated in FIG. 1, a motor drive device according to the present embodiment drives a synchronous motor 12 of an electric compressor 10. The synchronous motor 12 is a high voltage electric motor and corresponds to a motor according to the present embodiment. The electric compressor 10 is a compressor that is disposed in a heat pump cycle of a vehicle air conditioning apparatus with the use of, for example, carbon dioxide as a refrigerant, and drives a compression mechanism 11 as a load with the built-in synchronous motor 12.

The electric compressor 10 is an electric compressor that compresses and discharges a gas-phase refrigerant in the compression mechanism 11. The compression mechanism 11 compresses the refrigerant to a critical pressure or higher, and discharges the refrigerant if the refrigerant is, for example, a carbon dioxide refrigerant. For the compression mechanism 11, for example, a scroll compression mechanism or a rotary compression mechanism using a vane can be employed.

The synchronous motor 12 according to the present embodiment is, for example, a synchronous motor having a four-pole three-phase stator coil for rotationally driving a rotor with an embedded permanent magnet. The synchronous motor 12 is a permanent magnet synchronous motor whose rotor is rotationally driven by an interaction between the stator coil to which an AC voltage is input and the permanent magnet of the rotor.

A DC power supply 20 illustrated in FIG. 1 is a DC voltage supply source configured by a high voltage battery capable of outputting, for example, a voltage of 288 V. A high-voltage relay system 50 is disposed in a pair of buses 30 that extend from the DC power supply 20 to an inverter circuit 40. The high-voltage relay system 50 includes multiple relays and a resistive element. The high-voltage relay system 50 has a function of switching from a path having the resistive element to a path having no resistive element after starting a voltage application to prevent an inrush current from flowing in the buses 30, when applying a high voltage.

The high-voltage relay system 50 blocks a power supply path in a case where an abnormal state has been detected in the electric compressor 10 or the like.

As illustrated in FIG. 1, capacitors 60 and 70 functioning as smoothing devices are interposed between the pair of buses 30, which are the power supply paths from the DC power supply 20 to the inverter circuit 40. The capacitor 60 is disposed to smooth a voltage varied due to an influence of another electric device 9 that is connected to the buses 30 in parallel to the inverter circuit 40. In this example, the electric device 9 is formed of a vehicle travel motor drive device, a charging device, a step-down DC/DC conversion device, or the like.

When, for example, the multiple motor drive devices are mounted on a vehicle and the electric device 9 is formed of the vehicle travel motor drive device, the electric device 9 is a main drive device among the motor drive devices to which a power is supplied from the DC power supply 20, and the drive devices including the inverter circuit 40 are minor drive devices. In this example, the main drive device is a device larger in an input power fed from the DC power supply 20 than the minor drive devices. The main drive device may be a device to which the power is preferentially fed when a power supply to both of those drive devices is difficult.

When an input power to the electric device 9 is, for example, at least ten times as large as the input power to the electric compressor 10 through the inverter circuit 40, a variation in the voltage to be applied to the inverter circuit 40 from the DC power supply 20 through the buses 30 is likely to increase due to the influence of the electric device 9. The capacitor 60 is provided to reduce the voltage variation.

The capacitor 70 is provided to absorb surge and ripple caused by switching switching elements of the inverter circuit 40.

A coil 80 is disposed between a connection point between one of the buses 30 and the capacitor 60 and a connection point between the one bus 30 and the capacitor 70. The coil 80 is provided to reduce an interference between the capacitors 60 and 70 that are disposed in parallel between the buses 30. The coil 80 is disposed for the purpose of changing a resonant frequency generated according to a relationship between the capacitor 60 and the capacitor 70. The capacitor 70 that is a capacitor element and the coil 80 that is a coil element disposed in the inverter circuit 40 form a so-called LC filter circuit.

The coil 80 is a so-called normal coil. The coil 80 can be regarded as a coil component of a wiring connecting the capacitor 60 and the capacitor 70. A so-called common coil can be interposed between the capacitor 60 and the capacitor 70.

The inverter circuit 40 has arms of three phases of a U-phase, a V-phase, and a W-phase corresponding to stator coils of the synchronous motor 12, and converts a DC voltage input through the buses 30 into an AC voltage through a pulse width modulation and outputs the AC voltage. Hereinafter, the pulse width modulation may be called simply PWM.

Figure 2:
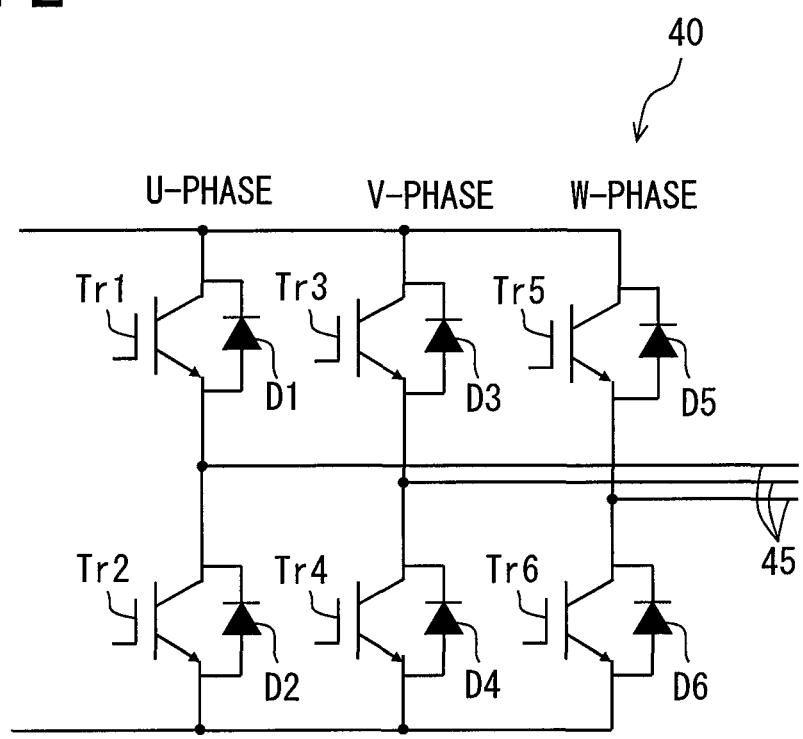
FIG. 2 is a circuit diagram showing a part of an inverter circuit according to the first embodiment.

As illustrated in FIG. 2, the U-phase arm is configured to have an upper arm illustrated upward in the drawing in which the switching element Tr1 and a reflux diode D1 are connected in anti-parallel to each other and a lower arm illustrated downward in the drawing in which the switching element Tr2 and a diode D2 are connected in anti-parallel to each other in the same manner. The upper arm and the lower arm are connected in series to each other. In the U-phase arm, an output line 45 extending from a connecting portion between the upper arm and the lower arm is connected to a motor coil. In this example, the anti-parallel connection means that the switching element and the diode are connected in parallel to each other so that a direction in which positive charge can flow in the switching element and a direction in which the positive charge can flow in the diode are opposite to each other.

The V-phase arm is configured to have an upper arm illustrated upward in the drawing in which the switching element Tr3 and a reflux diode D3 are connected in anti-parallel to each other and a lower arm illustrated downward in the drawing in which the switching element Tr4 and a diode D4 are connected in anti-parallel to each other in the same manner. The upper arm and the lower arm are connected in series to each other. The W-phase arm is configured to have an upper arm illustrated upward in the drawing in which the switching element Tr5 and a reflux diode D5 are connected in anti-parallel to each other and a lower arm illustrated downward in the drawing in which the switching element Tr6 and a diode D6 are connected in anti-parallel to each other in the same manner. The upper arm and the lower arm are connected in series to each other. Similarly, in the V-phase arm and the W-phase arm, an output line 45 extending from a connecting portion between the upper arm and the lower arm is connected to the motor coil. The diodes D1 to D6 are reflux diodes in the present embodiment.

The inverter circuit 40 includes a pair of units each having the switching element and the reflux diode connected in anti-parallel to the switching element, corresponding to each phase of the U-phase, the V-phase, and the W phase. Each of the upper arm and the lower arm of each phase arm corresponds to the unit in the present embodiment.

An element such as an insulated gate bipolar transistor (IGBT) can be used in the switching element. The arm that has the switching element and the diode may be a switching element such as a reverse conducting insulated gate bipolar transistor (RCIGBT) which is a power semiconductor in which the IGBT and a reverse conduction diode are integrated on one chip.

The output lines 45 are provided with a current detection device 90 for detecting a current flowing in the output lines 45 of one phase or multiple phases. A current transformer (current transformer) system, a Hall element system, or a shunt resistor system can be employed for the current detection device 90. The current detection device 90 outputs the detected voltage information to the control device 100.

A voltage detection device 95 for detecting a voltage between the buses 30, for example, on the connecting portions of the capacitor 70 is disposed between the pair of buses 30. A resistance division system can be employed for the voltage detection device 95. The voltage detection device 95 outputs the detected voltage information to the control device 100.

As a temperature detection device for detecting a temperature of the switching elements or the diodes, for example, a thermistor 41 is provided in the inverter circuit 40. The element temperature that is detected by the thermistor 41 is output to the control device 100.

The control device 100 controls the switching operation of the respective switching elements Tr1 to Tr6 in the inverter circuit 40 to control the driving of the synchronous motor 12. The control device 100 receives a compressor rotational speed command from an air conditioning apparatus control device 101 which is an example of a host control device. Hereinafter, the air conditioning apparatus control device may be called an A/C control device. The rotational speed command from the A/C control device 101 is an example of a motor drive state command. The host control device may be a control device for vehicle control. The host control device has a function of transmitting an on/off command of an operation flag of the compressor to the control device 100.

The control device 100 receives motor coil current information detected by the current detection device 90 and voltage information detected by the voltage detection device 95. The control device 100 calculates a rotational position of the motor on the basis of those input information in a position sensorless manner. The control device 100 receives element temperature information detected by the thermistor 41. The control device 100 determines a voltage command for controlling the synchronous motor 12 on the basis of the input information or the calculation information described above, generates a PWM wave that is a switching signal, and outputs the PWM wave to the inverter circuit 40.

The control device 100 is configured by, for example, a microcomputer, a dedicated IC, or the like as hardware. The control device 100 includes a detection circuit unit 100a, a control unit 100b, and a drive circuit unit 100e.

The detection circuit unit 100a receives a temperature information signal from the thermistor 41, a current information signal from the current detection device 90, and a voltage information signal from the voltage detection device 95, and converts those signals into state amounts used for control calculation. The control unit 100b receives the compressor rotational speed command from the host control device, the state amount from the detection circuit unit 100a, and so on, and outputs control information for realizing the rotational speed and current control of the motor in a position sensorless manner as a modulated signal.

The drive circuit unit 100e is configured by parts that generate a drive signal for operating the inverter circuit 40. The drive circuit unit 100e receives the modulated signal from the control unit 100b and outputs a PWM wave signal that is a pulsed drive signal to the inverter circuit 40.

The control unit 100b has a field weakening control unit 100c and a regenerative current control unit 100d. The field weakening control unit 100c performs a field weakening control to adjust the output of the AC voltage to the stator coil so that a magnetic field generated by the stator coil of the synchronous motor 12 weakens a field magnetic flux of the rotor of the synchronous motor 12. For example, when an induced voltage becomes larger than a power source voltage, the field weakening control unit 100c reduces the field magnetic flux while allowing a negative current to flow in a d-axis direction which is a direction of the magnetic flux generated by the magnetic pole of the rotating rotor. The field weakening control unit 100c reduces a motor terminal voltage within a limit value by causing the negative d-axis current to flow. When the synchronous motor 12 rotates at a high speed, the field weakening control unit 100c can increase a rotational speed limit of the synchronous motor 12 by, for example, advancing a current phase to perform the field weakening.

When the synchronous motor 12 stops from the rotation drive state, the regenerative current control unit 100d performs a dispersion control for regenerating a current by the stator coil of the synchronous motor 12 and dispersing a flow of the regenerative current flowing through the inverter circuit 40. The regenerative current control unit 100d switches parts of the switching elements Tr1 to Tr6 of the inverter circuit 40 so as to cause the current regenerated from the stator coil to dispersively flow.

The electric compressor 10 including the inverter circuit 40 and the control device 100 is disposed, for example, in an engine compartment of an automobile. The electric compressor 10 forms, for example, a refrigeration cycle device for a vehicle air conditioning apparatus together with a radiator, a decompressor, and an evaporator. The synchronous motor 12, the inverter circuit 40, and the control device 100 can be cooled by the refrigerant circulating in the refrigeration cycle.

Figure 3:
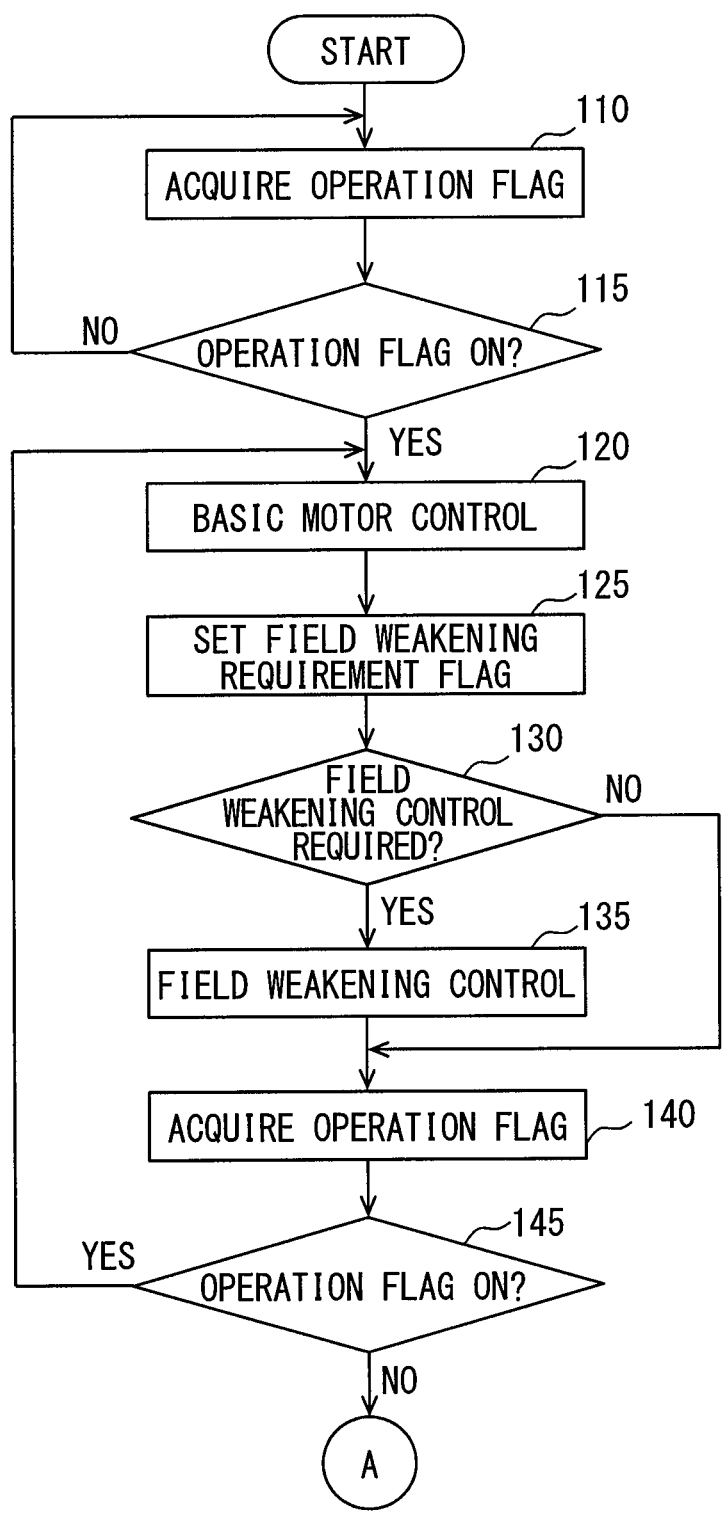
FIG. 3 is a flowchart illustrating a part of schematic control operation of a motor control device according to the first embodiment.

Next, motor operation control operation performed by the control unit 100b of the control device 100 will be described with reference to FIGS. 3 and 4. The control unit 100b corresponds to a substantial control device in the present embodiment. First, the control unit 100b acquires an operation flag for operating the synchronous motor 12 of the electric compressor 10 from the A/C control device 101 (Step 110). Next, the control unit 100b determines whether the operation flag acquired in Step 110 is on, or not (Step 115). If the control unit 100b determines in Step 115 that the operation flag is off, since the A/C control device 101 instructs a rotation stop state of the synchronous motor 12, the process returns to Step 110.

If the control unit 100b determines in Step 115 that the operation flag is on, the control unit 100b performs a basic motor control which is a basic motor control (Step 120). In Step 120, the synchronous motor 12 is driven under control so that a rotational speed of the synchronous motor 12 becomes a rotational speed command value (target rotational speed) based on the rotational speed command input from the A/C control device 101. The control unit 100b outputs a modulated wave signal, which is an applied voltage command to the motor coil of the synchronous motor 12, to the drive circuit unit 100e. The drive circuit unit 100e generates a switching wave for switching the switching elements Tr1 to Tr6 of the respective phase arms by comparing the input modulated wave signal with a carrier wave, and outputs the switching wave as a pulsed drive signal.

After execution of Step 120, the control unit 100b performs a calculation for determining whether field weakening is required within a basic motor control, or not, and sets a flag for determining whether the field weakening is required, or not (Step 125). In Step 125, for example, the control unit 100b determines whether the field weakening is required, or not, by comparing a power source voltage with an induced voltage induced in the stator coil, and sets a field weakening requirement flag.

After execution of Step 125, the control unit 100b determines whether the field weakening control is performed, or not, based on a setting state of the field weakening requirement flag (Step 130). If the control unit 100b determines that the field weakening control is to be performed in Step 130, the control unit 100b executes the field weakening control by the field weakening control unit 100c (Step 135).

After execution of Step 135, the control unit 100b acquires an operation flag for operating the synchronous motor 12 from the A/C control device 101 (Step 140). If the control unit 100b determines in Step 130 that the field weakening is not to be performed, the control unit 100b passes Step 135 and executes Step 140. After execution of Step 140, the control unit 100b determines whether the operation flag acquired in Step 140 is on, or not (Step 145). If the control unit 100b determines in Step 145 that the operation flag is on, since the A/C control device 101 instructs the rotation drive state of the synchronous motor 12, the process returns to Step 120.

Figure 4:
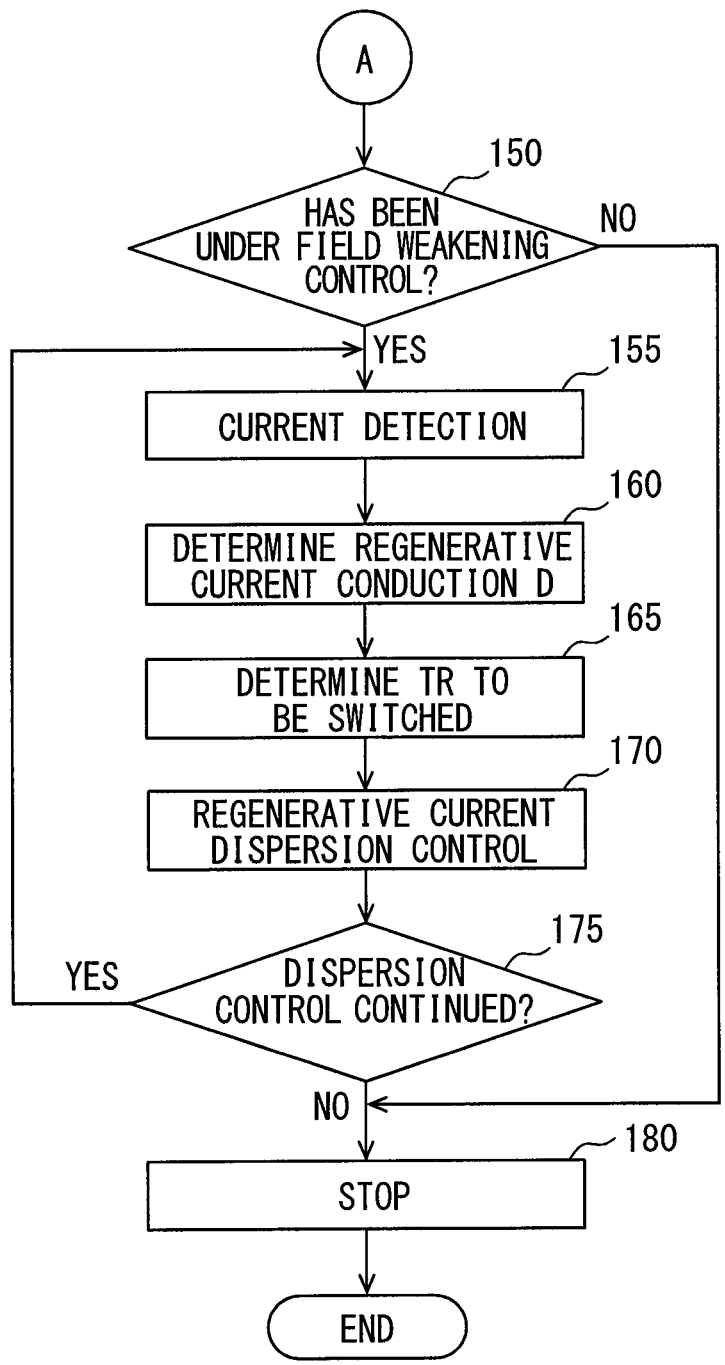
FIG. 4 is a flowchart illustrating the remaining part of the schematic control operation of the motor control device according to the first embodiment.

If the control unit 100b determines in Step 145 that the operation flag is off, since the A/C control device 101 instructs the rotation stop state of the synchronous motor 12, the process proceeds to Step 150 in FIG. 4.

If the control unit 100b determines in Step 145 that the operation flag is off, the control unit 100b determines in Step 150 whether Step 135 is executed, and the field weakening control by the field weakening control unit 100c is in progress, or not. Step 150 is synonymous with whether an affirmative determination is made, or not, in Step 130 just before it is determined that the operation flag is off in Step 145.

If the control unit 100b determines that the field weakening control is in progress in Step 150, the control unit 100b detects a current flowing in the output lines 45 through the detection circuit unit 100a (Step 155). The control unit 100b determines a phase of the regenerative current on the basis of the current detected in Step 155, and identifies a diode in which the regenerative current flows among the diodes D1 to D6 of the inverter circuit 40 (Step 160).

After the control unit 100b has identified the diode through which the regenerative current flows in Step 160, the control unit 100b determines a switching element to be switched in order to disperse the regenerative current (Step 165). In Step 165, the control unit 100b selects and determines a switching element to which the diode through which the regenerative current identified in Step 160 flows is not connected in anti-parallel, among the switching elements Tr1 to Tr6.

The inverter circuit 40 includes a pair of units each having the switching element and the reflux diode connected in anti-parallel to the switching element, corresponding to each phase of the U-phase, the V-phase, and the W phase. Therefore, in Step 165, in each phase arm of the U-phase, the V-phase, and the W-phase, the control unit 100b selects the switching element of the arm on a side opposite to the arm side where a regenerative current flows in the diode in the upper and lower arms.

For example, in the U-phase arm, a unit having the combination of the switching element Tr1 with the diode D1 forms the upper arm and a unit having the combination of the switching element Tr2 with the diode D2 forms the lower arm. Therefore, in the U-phase arm, when the regenerative current flows through the diode D1, the control unit 100b selects and determines the switching element Tr2. When the regenerative current is flowing through the diode D2, the control unit 100b selects and determines the switching element Tr1. Similarly, in the V-phase arm and the W-phase arm, the control unit 100b determines the switching elements.

The upper and lower arms of each phase arm are each configured by a unit having the switching element and the diode disposed in each arm. In each phase arm, a side of the unit where the regenerative current from the stator coil flows through the diode is called a regenerative side, and a side of the unit where the regenerative current from the stator coil does not flow through the diode is called an anti-regenerative side. The control unit 100b identifies the regenerative side diode in Step 160, and selects and determines the anti-regenerative side switching element in Step 165.

After execution of Step 165, the control unit 100b performs a regenerative current dispersion control in which the regenerative current dispersedly flows (Step 170). In Step 170, the control unit 100b switches the switching element determined in Step 165. In Step 170, the switching element is switched at a frequency higher than an electric angular frequency of the synchronous motor 12. For example, in Step 170, the switching element is switched at the same frequency as the carrier frequency in performing the basic motor control in Step 120.

After execution of Step 170, the control unit 100b determines whether to continue the dispersion control, or not (Step 175). In Step 175, for example, the control unit 100b determines whether the regenerative current value detected through the detection circuit unit 100a is equal to or less than a predetermined value, and determines whether to continue the dispersion control, or not. In Step 175, for example, the control unit 100b determines whether a predetermined time determined on the basis of a degradation characteristic of the regenerative current value at the time of performing the regenerative current dispersion control has elapsed, or not, and determines whether to continue the dispersion control, or not. The control operation in Steps 155 to 175 is executed by the regenerative current control unit 100d in the control unit 100b.

If the control unit 100b determines in Step 175 that the dispersion control is to be continued, the process returns to Step 155. On the other hand, if the control unit 100b determines in Step 175 that the dispersion control is not to be continued, the control unit 100b executes the stop operation of the motor drive control (Step 180). On the other hand, if the control unit 100b determines in Step 150 that the field weakening control is not being performed, the control unit 100b passes Steps 155 to 175, and the process proceeds to Step 180. In Step 180, the control unit 100b stops the output of the switching signal through the drive circuit unit 100e, and initializes the operation flag, the field weakening requirement flag, and so on. After execution of Step 180, the control unit 100*b* terminates the control operation, supplies the power to the electric compressor 10 to wait until a next control operation starts.

Figure 5:
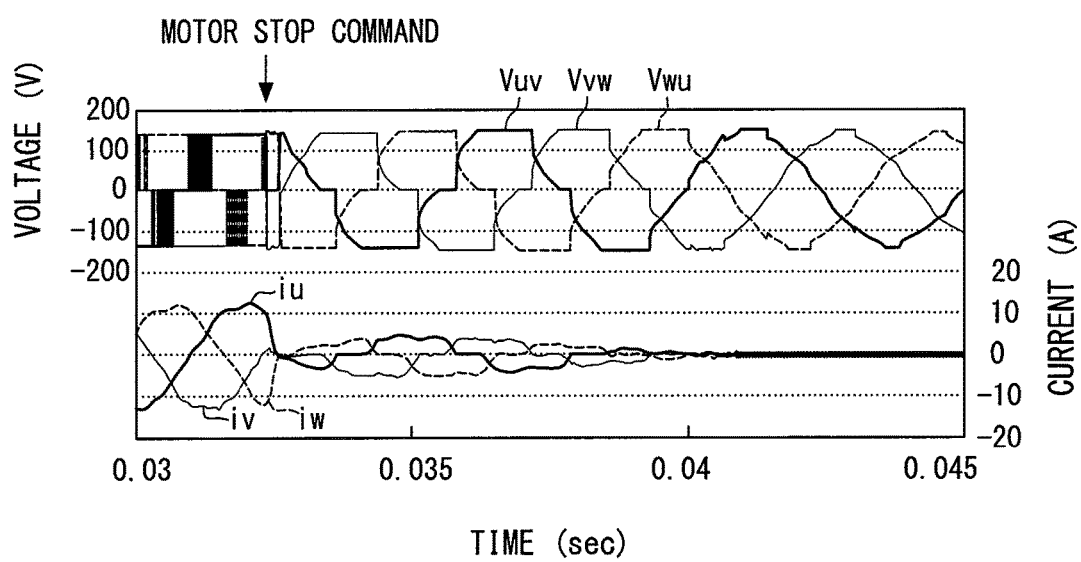
FIG. 5 is a time chart illustrating an example of a change in an interphase voltage and a phase current in the case where an output from the inverter circuit to a stator coil during field weakening is stopped.

FIG. 5 illustrates an example in which an output from the inverter circuit to the stator coil during the field weakening is stopped. An upper part of the figure shows a change in an output line-to-line voltage which is an interphase voltage, and a lower part of the figure shows a change in a phase current. The currents of all three phases converge to 0 A once immediately after having stopped the output upon receiving the stop command from the host control device. Thereafter, the synchronous motor 12 rotates due to an inertial force or the like with the result that the current flows again. In a region before the reception of the motor stop command in a graph showing the interphase voltage, a portion that seems to be blackened is a portion where the voltage repeatedly fluctuates at a high speed in association with the high-speed on/off switching operation of the switching elements.

Figure 6:
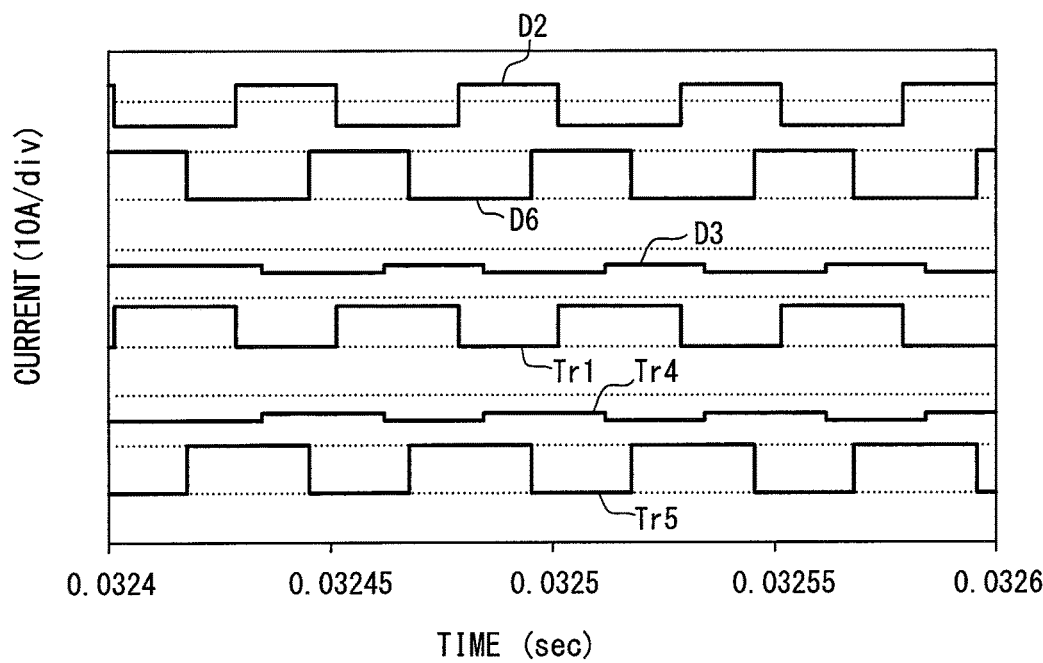
FIG. 6 is a time chart illustrating an example of a current flowing in each switching element and each diode immediately after the output to the stator coil has been stopped during the field weakening.

FIG. 6 illustrates an example of a current flowing in each switching element and each diode immediately after the output to the stator coil has been stopped during the field weakening according to the present embodiment. A current flows through the diodes D2, D3, and D6 of the regenerative side arm of the inverter circuit 40, but the switching elements Tr1, Tr4, and Tr5 of the anti-regenerative side arm are switched so that the regenerative current also flows in those switching elements. In an example illustrated in FIG. 6, the switching elements Tr1, Tr4, and Tr5 are switched at 20 kHz.

When the switching element Tr1 on the anti-regenerative side is turned on and the regenerative current flows, almost no regenerative current flows in the diode D2 on the regenerative side. In other words, the switching element Tr1 is switched to cause the regenerative current to alternately flow in the diode D2 and the switching element Tr1, thereby being capable of dispersing the regenerative current. Likewise, the switching element Tr4 is switched to cause the regenerative current to alternately flow in the diode D3 and the switching element Tr4, thereby being capable of dispersing the regenerative current. In addition, the switching element Tr5 is switched to cause the regenerative current to alternately flow in the diode D6 and the switching element Tr5, thereby being capable of dispersing the regenerative current.

Figure 8:
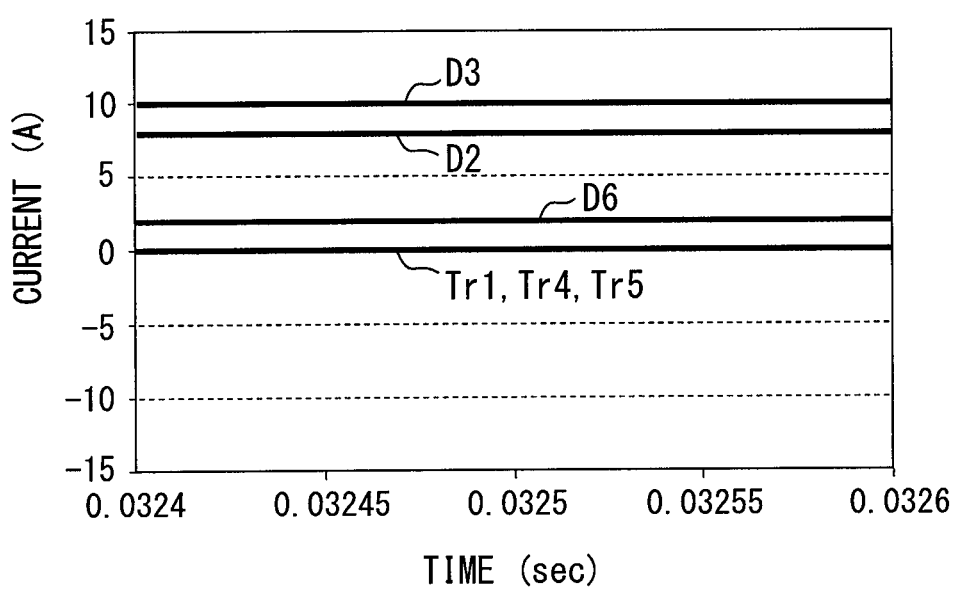
FIG. 8 is a time chart illustrating an example of a current flowing in each switching element and each diode immediately after the output to the stator coil has been stopped during the field weakening in a comparative example.

As in a comparative example illustrated in FIG. 8, when the switching elements are not switched immediately after having stopped the output to the stator coil during the field weakening, the regenerative currents are continuously supplied to the diodes D2, D3, and D6 of the regenerative side arms. As a result, the diode on the regenerative side generates a large amount of heat and increases a temperature, as a result of which the arm and the like on the regenerative side of the inverter circuit 40 may be damaged. According to the present embodiment, the inverter circuit 40 can be prevented from being damaged. Incidentally, in FIGS. 6 and 8, a direction in which the current flows in the switching elements and the diodes is indicated as positive.

As illustrated in FIG. 5, the current flowing in the stator coil of the synchronous motor 12 changes with an electric angle cycle when the synchronous motor 12 is rotating. For that reason, there is a need to change a phase in which the regenerative current is dispersed under the dispersion control depending on a state of the synchronous motor 12.

In addition, when the dispersion control is executed in a long cycle such as the electric angle cycle, the temperature of the switching element immediately increases and is liable to be damaged. Therefore, it is preferable to execute the switching operation in a cycle shorter than the electric angle cycle. For that reason, in the present embodiment, the anti-regenerative side switching element is switched at a frequency higher than the electric angular frequency of the synchronous motor 12. In the present embodiment, the anti-regenerative side switching element is switched, for example, at 20 kHz that is the same as the carrier frequency at the time of controlling the driving of the synchronous motor 12.

Figure 7:
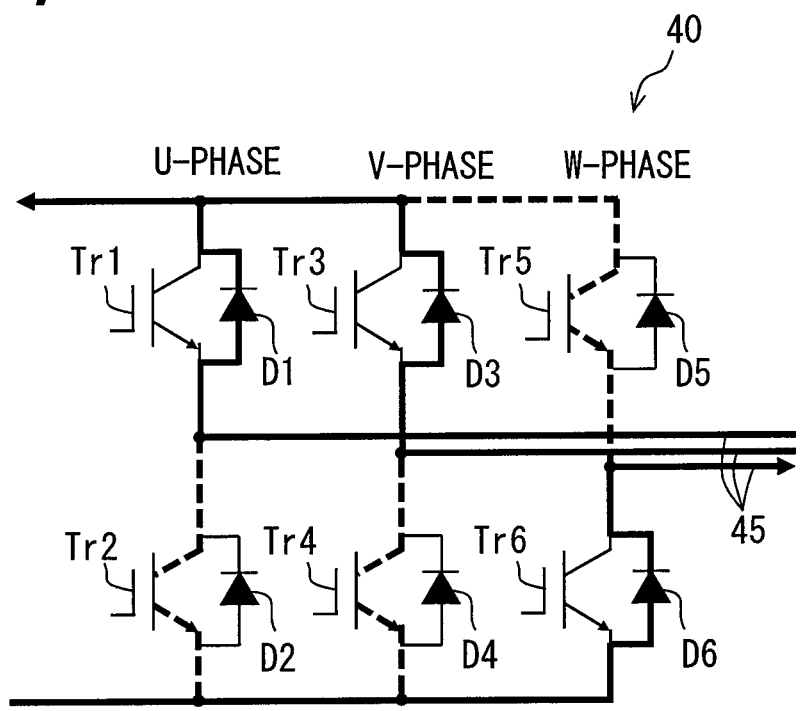
FIG. 7 is a circuit diagram illustrating an example of a path of a regenerative current flowing in the inverter circuit.

FIG. 7 illustrates an example of the regenerative current flowing in the inverter circuit 40 by regeneration in the stator coil of the synchronous motor 12 in a state where the output from the inverter circuit 40 to the stator coil is stopped. As indicated by bold solid lines, the regenerative current flows in the diodes D1 and D3 of the U-phase and V-phase upper arms and the diode D6 of the W-phase lower arm. When the regenerative current flows in paths indicated by the bold solid lines, the on/off operation of the switching elements Tr2 and Tr4 of the lower arms of the U-phase and the V-phase is controlled, and the on/off operation of the switching element Tr5 of the upper arm of the W-phase is controlled, thereby enabling the regenerative current to dispersedly flow in paths indicated by dotted lines.

According to the above configuration and operation, the control unit 100*b* of the control device 100 includes a field weakening control unit 100*c* and a regenerative current control unit 100*d*. When the operation flag is turned off and the voltage output to the stator coil is stopped while the field weakening control unit 100*c* is performing the field weakening control, the regenerative current control unit 100*d* switches the anti-regenerative side switching element, to thereby allow the regenerative current to flow in the element.

According to the above configuration, when the output of AC voltage to the stator coil is stopped while the field weakening control is being performed, the regenerative current can flow through the anti-regenerative side switching element. Therefore, when the synchronous motor 12 is stopped during the field weakening control and a relatively large regenerative current flows in the inverter circuit 40, the regenerative current can be distributed to not only the reflux diode but also the anti-regenerative side switching element. In this manner, the inverter circuit 40 can be prevented from being damaged due to the regenerative current.

The stop command of the synchronous motor 12 is acquired from the host control device to stop the inverter circuit 40, and the output to the stator coil is stopped when the motor terminal voltage is reduced to a limit value or lower under the field weakening control. Then, a large regenerative current flows in the inverter circuit 40. This is because the regenerative current caused by an energy stored in the stator coil of the synchronous motor 12 and the regenerative current caused by the induced voltage flow into the inverter circuit 40. According to the present embodiment, the inverter circuit 40 can be protected by dispersion control of the regenerative current flowing in the inverter circuit 40.

In addition, when the anti-regenerative side switching element performs switching operation, a reflux current flows from the anti-regenerative side switching element to the synchronous motor 12 side, thereby being capable of generating a torque for reducing the continuation of rotation in the synchronous motor 12. For that reason, the synchronous motor 12 can quickly decelerate to lower the induced voltage, and rapidly reduce a current value of the regenerative current.

The regenerative current control unit 100*d* switches the anti-regenerative side switching element at a frequency higher than an electric angular frequency of the synchronous motor 12. According to the above configuration, the temperature rise of the anti-regenerative side switching element due to the conduction of the regenerative current can be reduced. Therefore, even if the regenerative current also dispersively flows in the anti-regenerative side switching element, the inverter circuit 40 can be reliably prevented from being damaged due to the regenerative current.

In addition, the regenerative current control unit 100d switches all of the anti-regenerative side switching elements. According to the above configuration, the regenerative current can flow in all of the anti-regenerative side switching elements. Therefore, the regenerative current can reliably dispersedly flow, and the inverter circuit 40 can be further reliably prevented from being damaged due to the regenerative current.

Further, a load driven by the synchronous motor 12 of the present embodiment is the compression mechanism 11 that suctions and compresses the refrigerant of the refrigeration cycle. When the load of the synchronous motor 12 is the refrigerant compression mechanism of the refrigeration cycle, the regenerative energy of the synchronous motor 12 tends to become relatively large due to a refrigerant pressure and an inertia moment of the compression mechanism 11. Therefore, even when the motor load is the refrigerant compression mechanism 11 and the regenerative energy of the synchronous motor 12 is relatively large, the inverter circuit 40 can be prevented from being damaged due to the regenerative current.

In the description of the present embodiment, the regenerative current control unit 100d switches all of the switching elements on the anti-regenerative side, but the present disclosure is not limited to such a configuration. Parts of the anti-regenerative side switching elements may be switched.

Figure 9:
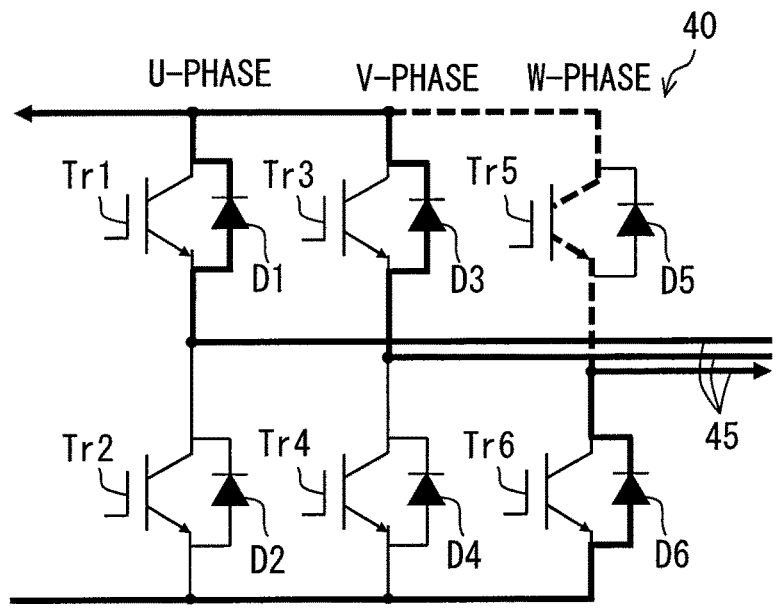
FIG. 9 is a circuit diagram illustrating another example of a path of a regenerative current flowing in the inverter circuit.

For example, as illustrated in FIG. 9, only parts of the anti-regenerative side switching elements may be switched. FIG. 9 illustrates the regenerative current flowing in the inverter circuit 40 by regeneration in the stator coil of the synchronous motor 12 in a state where the output from the inverter circuit 40 to the stator coil is stopped. As in the example illustrated in FIG. 7, in FIG. 9, the regenerative current flows in the diodes D1 and D3 of the U-phase and V-phase upper arms and the diode D6 of the W-phase lower arm.

As indicated by bold solid lines, the regenerative current flows in the diodes D1 and D3 for the two phases in the upper arm, and the regenerative current flows in the diode D6 for one phase in the lower arm. For that reason, at a timing in a state of FIG. 9, more regenerative current flows in the diode D6 of the W-phase than the diodes D1 and D3 of the U-phase and the V-phase, and the diode D6 of the W-phase is more strict about the regenerative current. Therefore, the on/off operation of the switching element Tr5 of the W-phase in the upper arm is controlled, thereby enabling the regenerative current to dispersedly flow also in the path indicated by a broken line in FIG. 9.

Second Embodiment

Next, a second embodiment will be described with reference to FIG. 10.

The second embodiment differs from the first embodiment described above in that a regenerative current dispersion control is performed so that losses of elements in which a regenerative current flows are substantially equal to each other. The same portions as those in the first embodiment are denoted by identical reference numerals, and their description will be omitted. Components denoted by the same symbols as those in the drawings according to the first embodiment and the other configurations not described in the second embodiment are identical with those in the first embodiment, and the same advantages are obtained.

Figure 10:
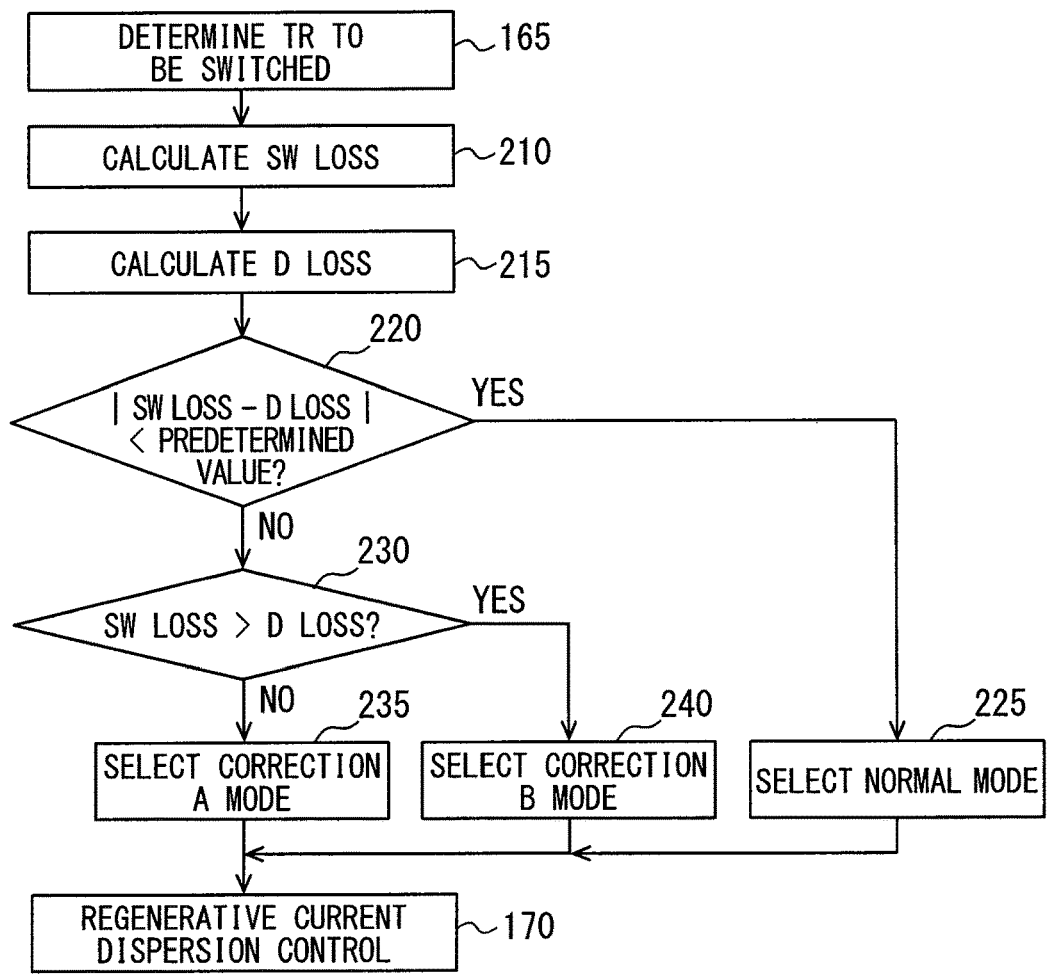
FIG. 10 is a flowchart illustrating a part of schematic control operation of a motor control device according to a second embodiment.

As illustrated in FIG. 10, after Step 165 has been executed, a regenerative current control unit 100d according to the present embodiment calculates a loss caused by the switching operation of a switching element to be switched (Step 210). Hereinafter, the loss caused by the switching operation of the switching element may be referred to as SW loss. Next, the loss caused by a diode in which a regenerative current flows is calculated (Step 215). Hereinafter, the loss caused by the diode may be referred to as D loss. The SW loss and the D loss are calculated based on a current value detected in Step 155. The SW loss and the D loss are calculated assuming that the switching operation of the anti-regenerative side switching element is performed at a predetermined duty ratio. The predetermined duty ratio can be set to, for example, a duty ratio in a normal mode selected in Step 225.

After Step 215 has been executed, it is determined whether an absolute value of a difference between the SW loss and the D loss is smaller than a predetermined value, or not (Step 220). If it is determined that the absolute value of the difference between the SW loss and the D loss is smaller than the predetermined value, the normal mode is selected as a dispersion control mode of the regenerative current (Step 225). In other words, when a deviation between the SW loss and the D loss is relatively small, the process proceeds to Step 225, and the normal mode is selected. In this example, the normal mode is a mode for performing the switching operation of the anti-regenerative side switching element at a predetermined duty ratio fixed in advance, similarly to the switching operation of the anti-regenerative side switching element in the first embodiment. The predetermined duty ratio can be set to, for example, 0.5 at which an on-time and an off-time of the switching operation are equal to each other.

If it is determined in Step 220 that the absolute value of the difference between the SW loss and the D loss is equal to or larger than the predetermined value, it is determined whether the SW loss is larger than the D loss, or not (Step 230). If it is determined in Step 230 that the SW loss is smaller than the D loss, a correction A mode is selected as a dispersion control mode of the regenerative current (Step 235). The correction A mode is a mode in which the duty ratio is adjusted so that the SW loss is increased and the D loss is decreased as compared with the normal mode. If it is determined in Step 230 that the SW loss is larger than the D loss, a correction B mode is selected as the dispersion control mode of the regenerative current (step 240). The correction B mode is a mode in which the duty ratio is adjusted so that the SW loss is decreased and the D loss is increased as compared with the normal mode.

When any one of Steps 225, 235, and 240 has been executed, the process proceeds to Step 170. In Step 170, the switching element determined in Step 165 is switched in the mode selected and set in any one of Steps 225, 235, and 240 executed immediately before.

According to the present embodiment, the regenerative current control unit 100d switches the anti-regenerative side switching elements such that an absolute value of a difference between mutual losses of the diode and the anti-regenerative side switching element in which the regenerative current flows becomes equal to or smaller than a predetermined value.

According to the above configuration, the losses of the diode in which the regenerative current flows and the switching element in which the regenerative current flows can be made substantially equal to each other. Therefore, the amount of heat generated in the diode in which the regenerative current flows and the switching element in which the regenerative current flows can be made substantially uniform. As a result, the inverter circuit 40 can be further reliably prevented from being damaged due to the regenerative current.

Third Embodiment

Next, a third embodiment will be described with reference to FIG. 11.

The third embodiment differs from the second embodiment described above in that a regenerative current dispersion control is performed so that regenerative current values of elements in which a regenerative current flows are substantially equal to each other. The same portions as those in the first and second embodiments are denoted by identical reference numerals, and their description will be omitted. Components denoted by the same symbols as those in the drawings according to the first and second embodiments and the other configurations not described in the third embodiment are identical with those in the first and second embodiments, and the same advantages are obtained.

Figure 11:
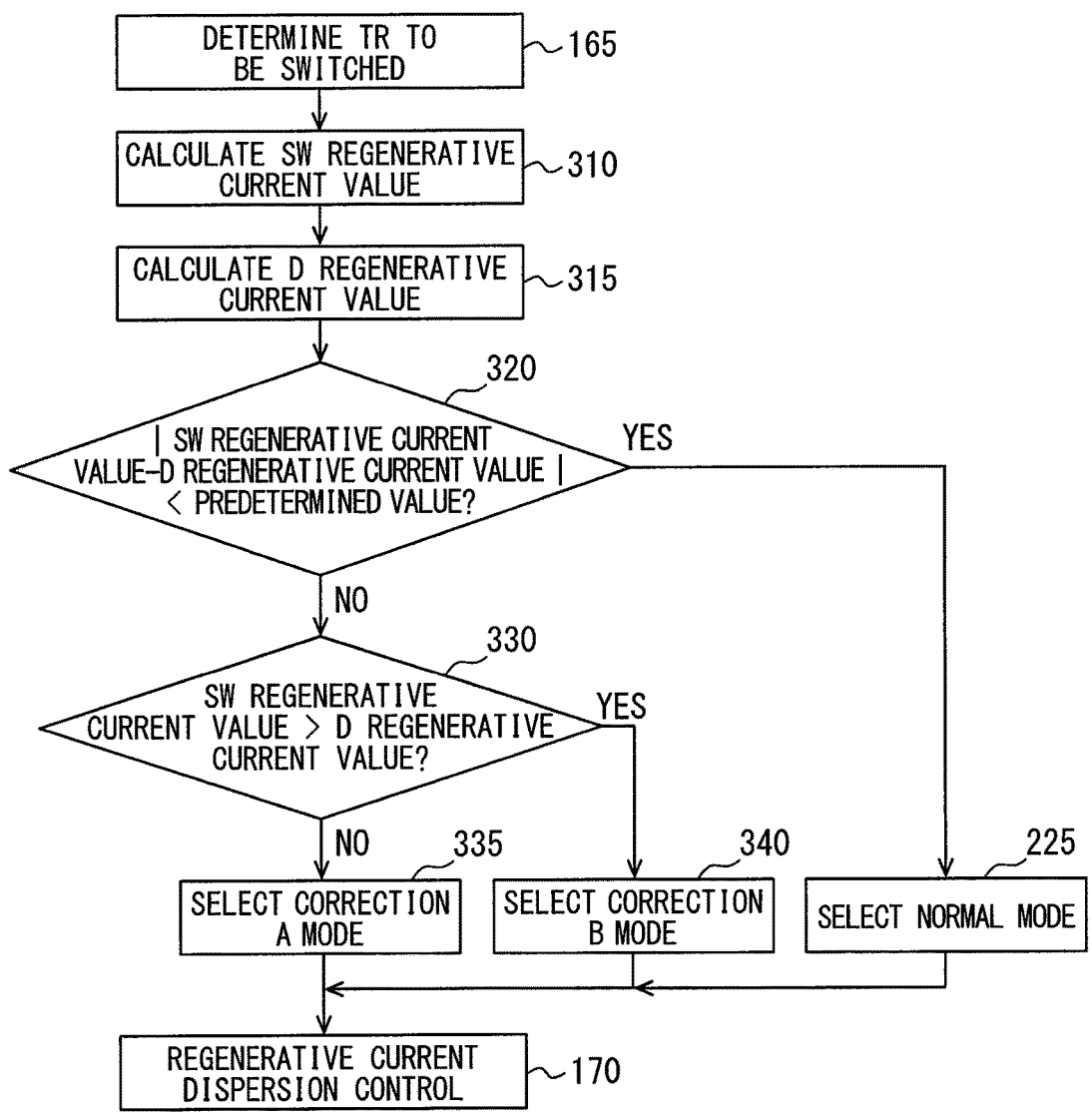
FIG. 11 is a flowchart illustrating a part of schematic control operation of a motor control device according to a third embodiment.

As illustrated in FIG. 11, after Step 165 has been executed, a regenerative current control unit 100d according to the present embodiment calculates a regenerative current value flowing in a switching element to be switched (Step 310). Hereinafter, the regenerative current value flowing in the switching element may be called an SW regenerative current value. Next, the regenerative current value in a diode in which the regenerative current flows is calculated (Step 315). Hereinafter, the regenerative current value in the diode may be called a D regenerative current value. The SW regenerative current value and the D regenerative current value are calculated based on the current value detected in Step 155. The SW regenerative current value and the D regenerative current value are calculated assuming that the switching operation of the anti-regenerative side switching element is performed at a predetermined duty ratio. The predetermined duty ratio can be set to, for example, a duty ratio in a normal mode selected in Step 225.

After Step 315 has been executed, it is determined whether an absolute value of a difference between the SW regenerative current value and the D regenerative current value is smaller than a predetermined value, or not (Step 320). If it is determined that the absolute value of the difference between the SW regenerative current value and the D regenerative current value is smaller than the predetermined value, the normal mode is selected as a dispersion control mode of the regenerative current (Step 225). In other words, when a deviation between the SW regenerative current value and the D regenerative current value is relatively small, the process proceeds to Step 225, and the normal mode is selected.

If it is determined in Step 320 that the absolute value of the difference between the SW regenerative current value and the D regenerative current value is equal to or larger than the predetermined value, it is determined whether the SW regenerative current value is larger than the D regenerative current value, or not (Step 330). If it is determined in Step 330 that the SW regenerative current value is smaller than the D regenerative current value, a correction A mode is selected as a dispersion control mode of the regenerative current (Step 335). The correction A mode is a mode in which the duty ratio is adjusted so that the SW regenerative current value is increased and the D regenerative current value is decreased as compared with the normal mode. If it is determined in Step 330 that the SW regenerative current value is larger than the D regenerative current value, a correction B mode is selected as a dispersion control mode of the regenerative current (Step 340). The correction B mode is a mode in which the duty ratio is adjusted so that the SW regenerative current value is decreased and the D regenerative current value is increased as compared with the normal mode.

When any one of Steps 225, 335, and 340 has been executed, the process proceeds to Step 170. In Step 170, the switching element determined in Step 165 is switched in the mode selected and set in any one of Steps 225, 335, and 340 executed immediately before.

According to the present embodiment, the regenerative current control unit 100d switches the anti-regenerative side switching elements such that an absolute value of a difference between mutual regenerative current values flowing in the diode and the anti-regenerative side switching element in which the regenerative current flows becomes equal to or smaller than a predetermined value.

According to the above configuration, the regenerative current values of the diode in which the regenerative current flows and the switching element in which the regenerative current flows can be made substantially equal to each other. Therefore, as in the second embodiment, the amount of heat generated in the diode in which the regenerative current flows and the switching element in which the regenerative current flows can be made substantially uniform. As a result, the inverter circuit 40 can be further reliably prevented from being damaged due to the regenerative current.

In the second and third embodiments, in order to substantially equalize the amount of heat generated in the diode in which the regenerative current flows and the switching element in which the regenerative current flows, the regenerative current dispersion control mode is switched among the three modes, but the present disclosure is not limited to this configuration. For example, the regenerative current dispersion control mode may be switched among four or more modes different in a duty ratio. Further, the duty ratio may be changed continuously.

Fourth Embodiment

Next, a fourth embodiment will be described with reference to FIG. 12.

The fourth embodiment differs from the first embodiment described above in that a dispersion control is performed only when it is determined that the dispersion of a regenerative current is necessary. The same portions as those in the first embodiment are denoted by identical reference numerals, and their description will be omitted. Components denoted by the same symbols as those in the drawings according to the first embodiment and the other configurations not described in the fourth embodiment are identical with those in the first embodiment, and the same advantages are obtained.

Figure 12:
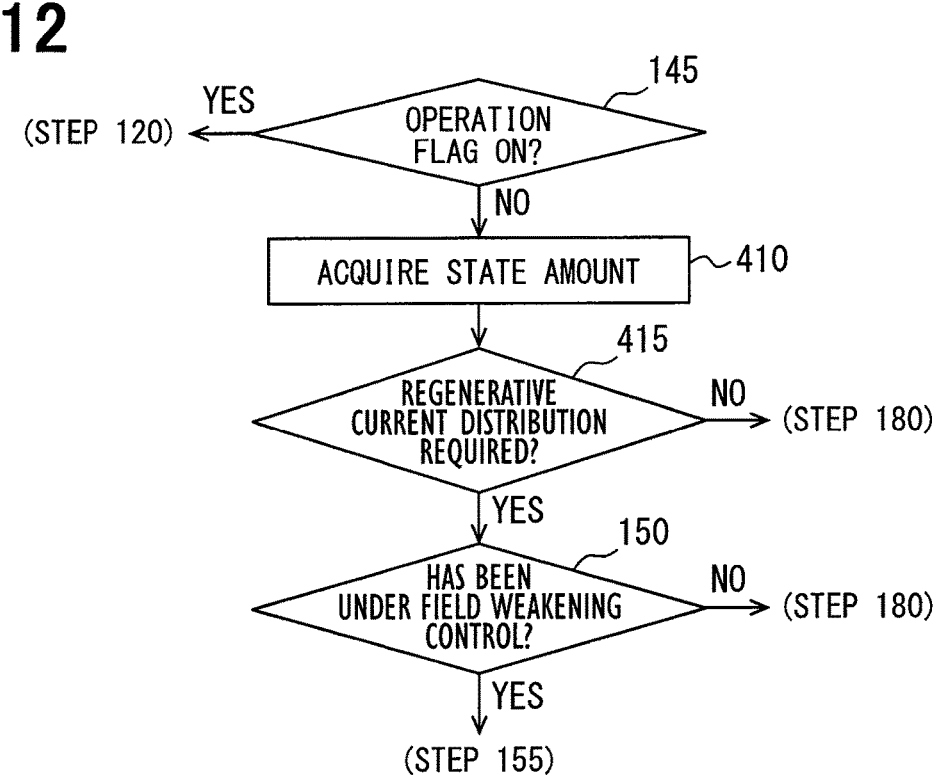
FIG. 12 is a flowchart illustrating a part of schematic control operation of a motor control device according to a fourth embodiment.

As illustrated in FIG. 12, when it is determined in Step 145 that the operation flag is off, the regenerative current control unit 100d according to the present embodiment acquires a state amount of the inverter circuit 40 (Step 410). The state amount of the inverter circuit 40 is a physical quantity related to the heat generation of the inverter circuit 40 in association with the conduction of the regenerative current. The physical quantity is the temperature of the switching elements, the temperature of the diodes, the loss of the switching elements, the loss of the diodes, the regenerative current value in the diode in which the regenerative current flows, or the regenerative current value in the switching element in which the regenerative current flows.

In Step 410, at least one of those values is acquired. The temperature of the switching elements and the temperature of the diodes can be obtained from a temperature detected by the thermistor 41. The regenerative current value in the diode in which the regenerative current flows and the regenerative current value in the switching element in which the regenerative current flows can be obtained from the detected value of the current detection device 90.

After Step 410 has been executed, it is determined whether the dispersion control of the regenerative current is necessary, or not, based on the state amount acquired in Step 410 (Step 415). In Step 415, determination is made by comparing the state amount acquired in Step 410 with a threshold. The threshold for comparison with the state amount is determined based on the heat resistance characteristics of, for example, the switching elements, the diodes, or the like. In Step 415, whether the dispersion control is required, or not, may be determined based on the comparison result between one state amount and the threshold, or whether the dispersion control is required, or not, may be determined by multiple combinations of comparison results of the state quantity and the threshold.

If it is determined in Step 415 that the dispersion control of the regenerative current is necessary, the process proceeds to Step 150. On the other hand, if it is determined in Step 415 that the dispersion control of the regenerative current is unnecessary, the process proceeds to Step 180 without switching the anti-regenerative side switching element.

In the present embodiment, Step 415 corresponds to a requirement determination unit that determines whether the switching operation of the anti-regenerative side switching element is required, or not. Step 415, which is the requirement determination unit, determines whether the switching operation of the anti-regenerative side switching element is required, or not, when the output of the AC voltage to the stator coil is stopped, based on the physical quantity relating to the heat generation of the inverter circuit 40 in association with the conduction of the regenerative current.

According to the present embodiment, when the requirement determination unit determines that the switching operation of the anti-regenerative side switching element is not required, the regenerative current control unit 100d prohibits switching operation of the anti-regenerative side switching element. According to the above configuration, when the amount of heat generated by the inverter circuit 40 is relatively small, the switching operation of the anti-regenerative side switching element is prohibited so that the regenerative current can be dispersed only when the amount of generated heat is relatively large.

Further, the physical quantity related to the heat generation of the inverter circuit 40 in association with the conduction of the regenerative current can include at least one of the following six physical quantities. The six physical quantities are the temperature of the switching elements, the loss of the switching elements, the regenerative current value of the anti-regenerative side switching elements, the temperature of the reflux diodes, the loss of the reflux diodes, and the regenerative current value of the reflux diodes. According to the above configuration, the switching operation of the anti-regenerative side switching element can be determined based on the physical quantity relating to the heat generation of the inverter circuit 40 which can be acquired relatively easily.

Incidentally, in the description of the present embodiment, Steps 410 and 415 are performed between Steps 145 and 150, but the present disclosure is not limited to the above configuration. Steps 410 and 415 may be performed between Steps 150 and 155. Further, Step 410 is not limited to the step performed after Step 145, and may acquire the state amount while Steps 120 to 145 are repeatedly executed.

Further, the physical quantity related to the heat generation of the inverter circuit 40 in association with the conduction of the regenerative current is not limited to the six physical quantities described above. For example, the temperature of a specific part of the inverter circuit 40 may be detected by a thermistor, and the detected temperature may be set as a physical quantity related to the heat generation of the inverter circuit 40 in association with the conduction of the regenerative current.

Fifth Embodiment

Next, a fifth embodiment will be described with reference to FIG. 13.

The fifth embodiment is different from the first embodiment in that a path for dispersing the regenerative current is determined in an initial state when the output from the inverter circuit is stopped. The same portions as those in the first embodiment are denoted by identical reference numerals, and their description will be omitted. Components denoted by the same symbols as those in the drawings according to the first embodiment and the other configurations not described in the fifth embodiment are identical with those in the first embodiment, and the same advantages are obtained.

Figure 13:
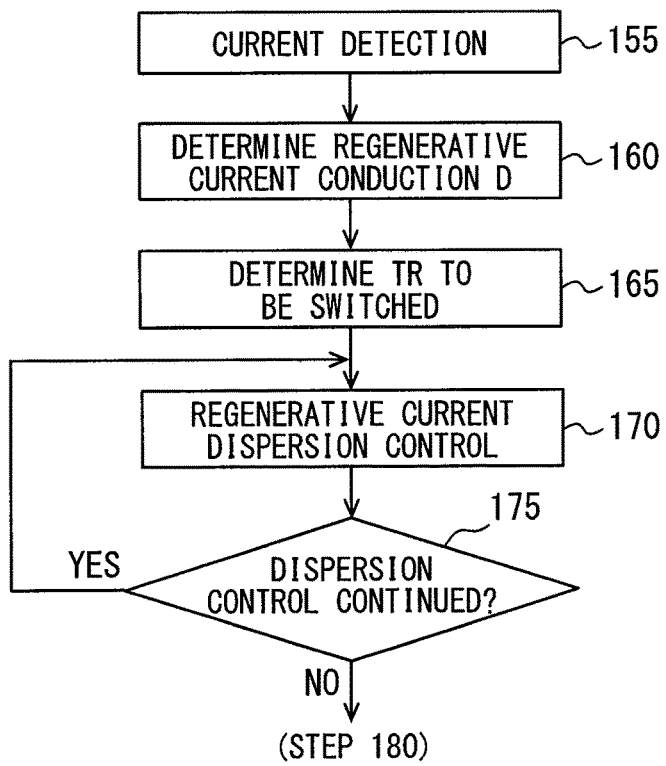
FIG. 13 is a flowchart illustrating a part of schematic control operation of a motor control device according to a fifth embodiment.

As illustrated in FIG. 13, the regenerative current control unit 100d according to the present embodiment determines in Step 175 that the dispersion control is to be continued, the process returns to Step 170. Therefore, when the regenerative current dispersion control is continuously performed in Step 170, the switching element determined in Step 165 is continuously switched.

According to the present embodiment, the regenerative current control unit 100d continuously switches the anti-regenerative side switching element when the output of the AC voltage to the stator coil is stopped even when the reflux diodes into which the regenerative current flows are sequentially switched to another. According to the above configuration, the anti-regenerative side switching element in a flowing state of the regenerative current when the output of the AC voltage to the stator coil is stopped is continuously switched so that the regenerative current can be dispersed. In other words, the subsequent dispersion control of the regenerative current can be performed based on a regenerative initial state immediately after receiving the motor stop command. Therefore, the dispersion control of the regenerative current can be simplified.

Other Embodiments

In each of the above embodiments, the switching elements Tr1 to Tr6 are switching elements of the same specification, and the diodes D1 to D6 are diodes of the same specification, but the present disclosure is not limited to the above configuration. The element specifications of some switching elements and diodes may be different from others.

For example, switching elements with improved cooling performance and heat-radiating performance may be used for some switching elements.

For example, a switching element of rated up specification may be adopted as a part of the switching elements Tr1 to Tr6 illustrated in FIG. 2, and a regenerative current may be caused to flow by leveraging a large number of rated up specification switching elements. According to the above configuration, even when the damage control of the inverter circuit is not sufficient only by the regenerative current dispersion control, the damage control can be realized by a combination of a minimum rating upgrade and a regenerative current distribution control.

For example, the switching elements rated up are employed for the switching elements Tr2, Tr4, and Tr6 disposed in the lower arms of the respective phase arms among the switching elements Tr1 to Tr6 illustrated in FIG. 2, and used for the dispersion control of the regenerative current. In the inverter circuit that executes the switching operation of the switching elements Tr1, Tr3, and Tr5 of the upper arms of the respective phase arms using a bootstrap, the switching elements of the upper arm cannot be switched in an arbitrary section. However, the switching elements of the lower arms can be switched in the arbitrary section.

In the above respective embodiments, the anti-regenerative side switching element is switched at a frequency higher than the electric angular frequency of the synchronous motor 12, but the present disclosure is not limited to such a configuration. For example, as long as heat generation of elements such as the switching elements and the diodes can be reduced, the anti-regenerative side switching element may be switched at a frequency equal to or lower than the electric angular frequency of the synchronous motor 12.

In the respective embodiments described above, the synchronous motor 12 whose driving is controlled by the motor drive device is a three-phase motor. However, the present disclosure is not limited to the three-phase motor. For example, the synchronous motor 12 may also be a motor with multiple phases having two phases or at least four phases.

In the embodiments described above, the motor drive device drives the motor using the compression mechanism of the compressor disposed in the refrigeration cycle of the vehicle air conditioning apparatus as a load. However, the present disclosure is not limited to the above configuration. The load may be a compression mechanism used other than the refrigeration cycle, or may be other than the compression mechanism. Further, the motor drive device may not be mounted on the vehicle. The motor drive device according to the present disclosure may be mounted on a moving object other than the vehicle or may be used fixedly.

It is noted that a flowchart or the processing of the flowchart in the present application includes sections (also referred to as steps), each of which is represented, for instance, as 110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor driving device for a motor that includes: a stator having a plurality of stator coils corresponding to a plurality of phases respectively; and a rotor having a permanent magnet and rotationally driven by an interaction between the stator coil, to which an AC voltage is input, and the permanent magnet, the motor driving device comprising:
    an inverter circuit that includes a plurality of units corresponding to plurality of phases respectively, each unit having a pair of a switching element and a reflux diode connected in anti-parallel to the switching element; and
    a control device that controls the inverter circuit to switch each switching element, to convert a DC voltage into the AC voltage, and to output the AC voltage to the stator coil, wherein:
    the control device includes:
        a field weakening control unit that performs a field weakening control for adjusting an output of the AC voltage to the stator coil to control a magnetic field generated by the stator coil to weaken a field magnetic flux of the rotor; and
        a regenerative current control unit that switches an anti-regenerative side switching element being a switching element of one of the plurality of units in which no regenerative current flows into the reflux diode from the stator coil, and flows a regenerative current through the anti-regenerative side switching element when the output of the AC voltage to the stator coil is stopped while the field weakening control unit performs the field weakening control.

2. The motor drive device according to claim 1, wherein:
    the regenerative current control unit switches the anti-regenerative side switching element at a frequency higher than an electric angular frequency of the motor.

3. The motor drive device according to claim 1, wherein:
    the regenerative current control unit switches all of anti-regenerative side switching elements.

4. The motor drive device according to claim 1, wherein:
    the regenerative current control unit switches the anti-regenerative side switching element to control an absolute value of a difference between a loss of the reflux diode and a loss of the anti-regenerative side switching element or an absolute value of a difference between a regenerative current value of the reflux diode and a regenerative current value of the anti-regenerative side switching element to be equal to or less than a predetermined value, the reflux diode and the anti-regenerative side switching element into which the regenerative current flows.

5. The motor drive device according to claim 1, wherein:
    the regenerative current control unit further includes a requirement determination unit that determines, based on a physical quantity relating to a heat generation of the inverter circuit in association with a conduction of the regenerative current, whether a switching operation of the anti-regenerative side switching element is required when the output of the AC voltage to the stator coil is stopped; and
    when the requirement determination unit determines that the switching operation of the anti-regenerative side switching element is not required, the requirement determination unit prohibits the switching operation of the anti-regenerative side switching element.

6. The motor drive device according to claim 5, wherein:
the physical quantity relating to the heat generation of the inverter circuit in association with the conduction of the regenerative current includes at least one of a temperature of each switching element, a loss of each switching element, a regenerative current value of the anti-regenerative side switching element, a temperature of the reflux diode, a loss of the reflux diode, and a regenerative current value of the reflux diode.

7. The motor drive device according to claim 1, wherein:
the regenerative current control unit continuously switches the anti-regenerative side switching element at a time when the output of the AC voltage to the stator coil is stopped in a case where each reflux diode into which the regenerative current flows is sequentially switched to another.

8. The motor drive device according to claim 1, wherein:
a load driven by the motor is a compression mechanism that suctions and compresses a refrigerant of a refrigeration cycle.

* * * * *